(12) United States Patent
Perez (10) Patent No.: US 10,975,957 B2
(45) Date of Patent: Apr. 13, 2021

(54) SHIFT-BY-WIRE WITH INTEGRATED FEEDBACK SYSTEM

(71) Applicant: Pedro Jose Albaladejo Perez, Alguazas (ES)

(72) Inventor: Pedro Jose Albaladejo Perez, Alguazas (ES)

( * ) Notice: Subject to any disclaimer, the term of this patent is extended or adjusted under 35 U.S.C. 154(b) by 28 days.

(21) Appl. No.: 16/280,958

(22) Filed: Feb. 20, 2019

(65) Prior Publication Data

US 2020/0263785 A1    Aug. 20, 2020

(51) Int. Cl.
*F16H 59/08*    (2006.01)
*F16H 61/24*    (2006.01)
*F16H 63/42*    (2006.01)

(52) U.S. Cl.
CPC .............. *F16H 59/08* (2013.01); *F16H 61/24* (2013.01); *F16H 63/42* (2013.01); *F16H 2063/423* (2013.01)

(58) Field of Classification Search
CPC .......... F16H 59/08; F16H 61/24; F16H 63/42; F16H 2063/423
See application file for complete search history.

(56) References Cited

U.S. PATENT DOCUMENTS

| | | | | |
|---|---|---|---|---|
| 2014/0149909 A1* | 5/2014 | Montes | ................. | B60K 20/08 715/771 |
| 2014/0283639 A1* | 9/2014 | Kim | ....................... | F16H 59/08 74/473.12 |
| 2014/0318295 A1* | 10/2014 | Kim | ....................... | F16H 59/08 74/473.12 |
| 2018/0079302 A1* | 3/2018 | Tsai | ...................... | B60K 20/00 |
| 2018/0298959 A1* | 10/2018 | Battlogg | .................. | A61F 2/68 |

* cited by examiner

*Primary Examiner* — David J Hlavka
(74) *Attorney, Agent, or Firm* — Austin Tyler Cairns (57) ABSTRACT

A shift-by-wire system comprising one or more touch sensitive displays, a memory, one or more processors, and one or more modules stored in the memory. The one or more modules are comprised of instructions executable by one or more processors to display a gear selection indicator at a predefined region. The gear selection indicator is displayed in a predefined region as instructed by the transmission control unit. The processor detects a contact with the one or more touch sensitive displays at the predefined region corresponding to a gear selection indicator and determines a gesture performed by a user to associate the gesture with a gear selection. An output signal is then transmitted to the transmission control unit corresponding the gear selection and affects a vehicle transmission. The newly selected gear is then displayed via the gear selection indicator on the predefined region.

13 Claims, 7 Drawing Sheets

SHIFT-BY-WIRE WITH INTEGRATED FEEDBACK SYSTEM

BACKGROUND

Conventional motor vehicles include a gear selector or shifter to operate the motor vehicle. The gear selector in a vehicle having a manual transmission is often located in the center console and includes an indication of the gear in which the transmission is operating including the reverse, and gear at which the vehicle is operating. In a vehicle having an automatic transmission, the gear selector includes the park, neutral, reverse, high gear, or lower gears. In some other vehicles such as electric vehicles the motor may be directly controlled without a gear transmission. In those cases with "transmission gear" we maybe referring to the motor direction (forward or backward) or the motor status (neutral or park).

The general order of the gear is regulated to prevent confusion amongst motor vehicle operators, commonly referred to as PRNDL. Generally, the gear selector is provided on the center console or instrument panel to allow the operator easy access to the instrument.

Commonly, the gear selector includes markings to indicate the gear at a given orientation or position. In recent years, some rotational buttons or touchscreen gear selectors have been created. While touchscreen gear selectors offer a more appealing and sometimes desirable user interface for operating the vehicle, these systems require the driver to look at the display to confirm proper gear selection resulting in distraction of the driver and a potentially dangerous scenario. No system in the current arts includes a driver feedback mechanism to increase safety and efficiency while engaging in various operational functions of the vehicle.

SUMMARY OF THE INVENTION

Embodiments described herein provide for a shift-by-wire system comprising one or more touch sensitive displays, a memory, one or more processors, and one or more modules stored in the memory. The one or more modules are comprised of instructions executable by one or more processors to display the gear symbols and a gear selection indicator at the predefined selection regions. The gear selection indicator is displayed in a predefined region as instructed by the transmission control unit. The processor detects a contact with the one or more touch sensitive displays at the predefined region corresponding to a gear selection indicator and determines a gesture performed by a user to associate the gesture with a gear selection. An output signal is then transmitted to the transmission control unit corresponding the gear selection and affects a vehicle transmission. The newly selected gear is then displayed via the gear selection indicator on the predefined region.

A shift-by-wire or electronic shifter may be applicable to any vehicle where the automatic transmission or motor is electronically actuated without any mechanical link.

In one aspect, the touch-sensitive display is comprised of a 3-dimensional surface having the plurality of predefined regions, wherein each predefined region corresponds to a unique gear selection.

In one aspect, the 3-dimensional surface is sectioned by separations between a plurality of 3-dimensional surfaces.

In another aspect, the predefined shifting regions are defined by elevated or depressed regions of the 3-dimensional surface.

In one aspect, the 3-dimensional touch-sensitive display is comprised of at least two displays, wherein at least two of the displays are positioned in non-parallel planes.

In one aspect, the 3-dimensional display is comprised of at least one curved display.

In one aspect, the memory includes instructions to display a visual cue to communicate a direction a permitted gesture to perform a shift function. The visual cue can include text, imagery, symbols, or other visual cues. In another aspect, the visual cues comprise an arrow indicating the permitted direction of the gesture between a first region and a second region.

In another aspect, the system includes instructions to display a visual alert to the driver to indicate the acceptance or denial of the gear selection gesture.

In one aspect, an electromagnetic actuator creates haptic feedback signals to indicate the acceptance or denial of the gear selection gesture.

In one aspect, the selected gear indicator is moved according to the transmission control unit during autonomous operation of the vehicle.

In one aspect, the touch sensitive screen further comprises a force sensor permitting gear selection via push actuation on the predefined gear selection region.

In another aspect, the force sensor and the electromagnetic actuator are in operable communication to provide feedback to a gesture.

In one aspect, the gear selection indicators are letters, symbols, words, or images.

In one aspect, the gear selection indicators include at least one of the following: one or more arrows, wherein a forward arrow corresponds to a drive gear selection, wherein a rearward arrow corresponds to a reverse gear selection, wherein a pause symbol corresponds to a neutral gear selection and wherein a stop symbol corresponds to a park gear selection.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only, and no unnecessary limitation or inferences are to be understood therefrom.

Any reference to "invention" within this document is a reference to an embodiment of a family of inventions, with no single embodiment including features that are necessarily included in all embodiments, unless otherwise stated. Furthermore, although there may be references to "advantage's" provided by some embodiments, other embodiments may not include those same advantages or may include different advantages. Any advantages described herein are not to be construed as limiting to any of the claims.

Before describing in detail exemplary embodiments, it is noted that the embodiments reside primarily in combinations of components related to the wireless speaker set and flexible mounting means. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics unless otherwise indicated.

In general, the embodiments presented herein relate to a shift-by-wire system wherein the transmission or motor of the vehicle is controlled by an electronic gear selection. The embodiments allow for greater accessibility as the gear selector is available to the driver at a convenient location within the vehicle. The gear selector may be ergonomically designed to promote driver comfort during operation of the vehicle. In such, the gear selector is preferably placed within reach of the driver during operation of the vehicle. The gear selector is also intuitive in a function having a similar shifting pattern as known in the arts. An interactive display informs the user of the chosen gear, in addition to the available gear options. A feedback mechanism provides feedback to the driver during operation of the vehicle including a selection of a gear. Often, the legislation mandates shifter orientation, layout, order, and operational characteristics.

The current gear selectors require attentiveness of the driver, including visual, tactile, and audio attentiveness. The present embodiments provide for differentiable interaction between the gear selector and driver during operational interactions. It is a goal of the present embodiments to provide visual and tactile feedback to the driver during operation of the vehicle having the gear selector. Further, the embodiments provide a gear selector which emits a positive feedback corresponding to an accepted engagement of the gear selector and provides negative feedback to a denied or unaccepted engagement of the gear selector.

The term "feedback" as used herein may relate to tactile feedback which may include haptic feedback, audible feedback, visual feedback, or any other form of user feedback known in the arts. For example, a single haptic feedback stimulus such as vibration may be emitted upon proper gear selection by the driver, while a plurality of stimuli (such as haptic feedback vibrations) can be emitted if an improper gear selection is made, alerting the user of the improper selection of the gear.

In general, the embodiments herein provide a shift-by-wire device configured to display indicators for each gear selection of a vehicle. The device includes a touchscreen display allowing the user to perform a gesture to modify the selected gear of the vehicle. The display will show the selected gear indicator at a predefined location in accordance with the signal of the transmission control unit. The transmission control unit detects a contact with the device having the touch-sensitive display and correspond the contact with a gear selection. Movement from the contact point results in the continuous movement of the gear selection indicator in according with the movement of the contact point created by the user. The interactive movement of the contact point established by the driver of the vehicle will in-turn shift the transmission control to the selected gear.

Figure 1A:
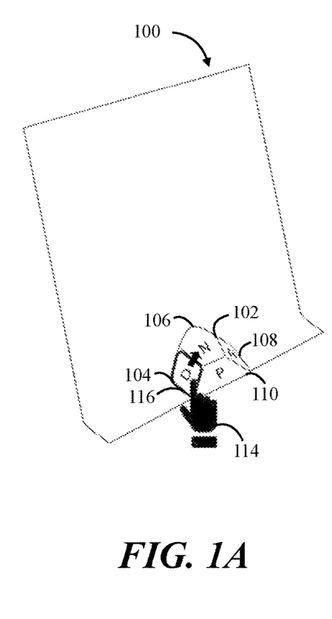
FIG. 1A illustrates the shift-by-wire system including the touch-sensitive display and user performing a gesture, according to some embodiments.
Figure 1B:
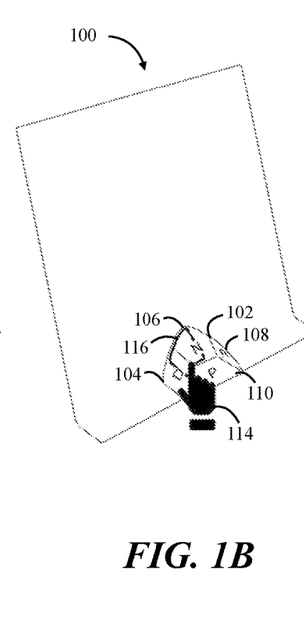
FIG. 1B illustrates the shift-by-wire system including the touch-sensitive display and user performing a gesture, according to some embodiments.
Figure 1C:
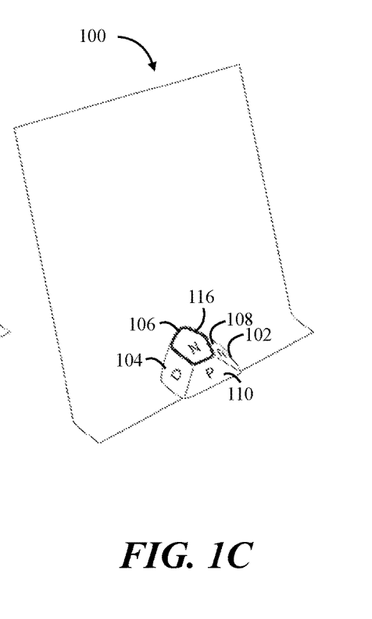
FIG. 1C illustrates the shift-by-wire system including the touch-sensitive display and gear selection indicator, according to some embodiments.

FIGS. 1A, 1B, and 1C illustrate the shift-by-wire device 100 including a display 102. The display is a touch-sensitive display which may utilize curved glass or similar touch-sensitive display mediums known in the arts. The display 102 is separated into a plurality of regions each corresponding to a gear selection. In the illustrated example, the first region 104 operates the "drive" gear selection, the second region 106 operates the "neutral" gear selection, the third region 108 operates the "reverse" gear selection, and the fourth region 110 operates the "park" gear selection. In some embodiments, high and low gears may be illustrated in additional regions of the display 102. The regions may be defined visually by the imagery shown on the display 102 or may additionally be defined by physical separation of the surface 112 of the display.

In one example, the driver 114 performs a gesture (shown by the arrow) by touching a first region 104 and dragging the point-of-contact to the second region 106.

Figure 2A:
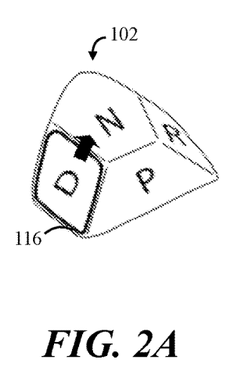
FIG. 2A illustrates the touch-sensitive display and a first gesture indicator, according to some embodiments.
Figure 2B:
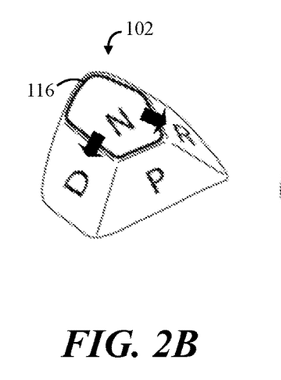
FIG. 2B illustrates the touch-sensitive display and a second gesture indicator, according to some embodiments.
Figure 2C:
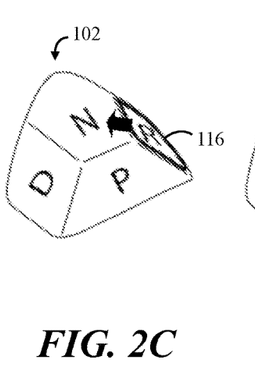
FIG. 2C illustrates the touch-sensitive display and a third gesture indicator, according to some embodiments.
Figure 2D:
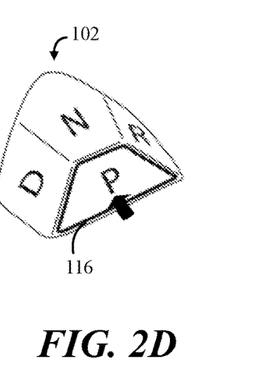
FIG. 2D illustrates the touch-sensitive display and a fourth gesture indicator, according to some embodiments.

FIGS. 2A, 2B, 2C, and 2D illustrate gesture sequences performed by the user. FIG. 2A illustrates a first gesture wherein the driver contacts the first region 104 and moves the contact point to the second region, thus shifting the gear selection from "drive" to "neutral. FIG. 2B illustrates a second gesture wherein the driver contacts the second region 106 and moves the contact point to the first region 104 (thus shifting the gear selection from "neutral" to "drive") or the third region 108 (thus shifting the gear selection from "neutral" to "reverse"). FIG. 2C illustrates a third gesture wherein the driver contacts the third region 108 and moves the contact point to the second region 106 to shift the gear selection from "reverse" to "neutral." FIG. 2D illustrates a fourth gesture wherein the driver contacts and push on the fourth region 106 to shift the gear selection from "neutral" to "park."

Figure 3:
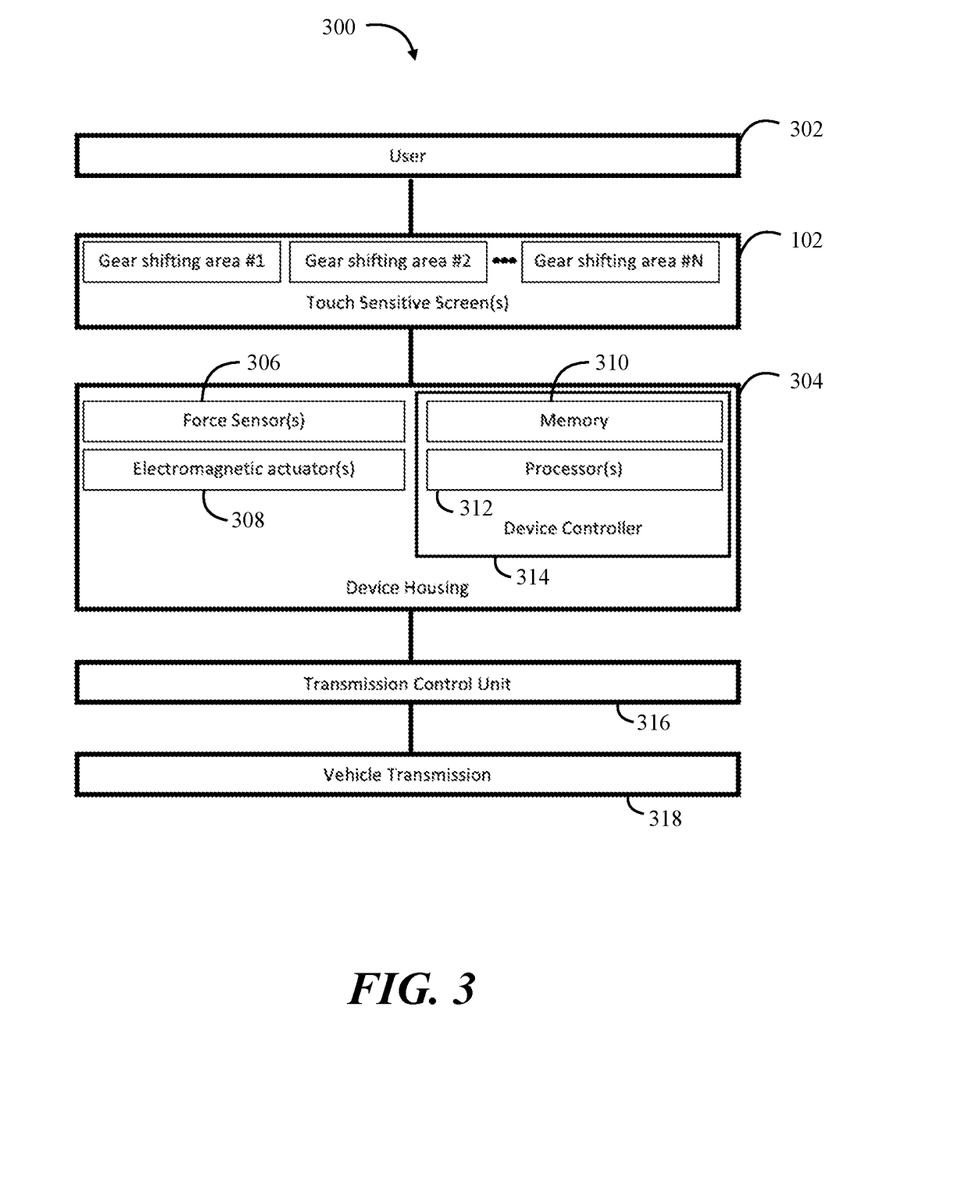
FIG. 3 illustrates a block diagram of the shift-by-wire system, according to some embodiments.

FIG. 3 illustrates a block diagram of the system 300 including a user (driver) 302 in operable communication with the shift-by-wire device 100 having a touch-sensitive display 102 separable into a plurality of regions. The system 300 is contained in a housing 304 which includes a plurality of force sensors 306, electromagnetic actuators 308, a memory 310, one or more processors 312 and a device controller 314. The processor 312 receives an input signal from the touch-sensitive display to determine a contact point on the display 102. The contact point is associated with a region on the display. Any movement from one region to another region is sensed by the touch-sensitive display and transmitted to the processor to determine a gear selection which is transmitted to a transmission control unit 316 in operable communication with the vehicle transmission 318.

In some embodiments, an electromagnetic actuator 308 provides haptic feedback to the driver upon touching, moving, or altering the display to modify the selected gear of the vehicle.

Figure 4:
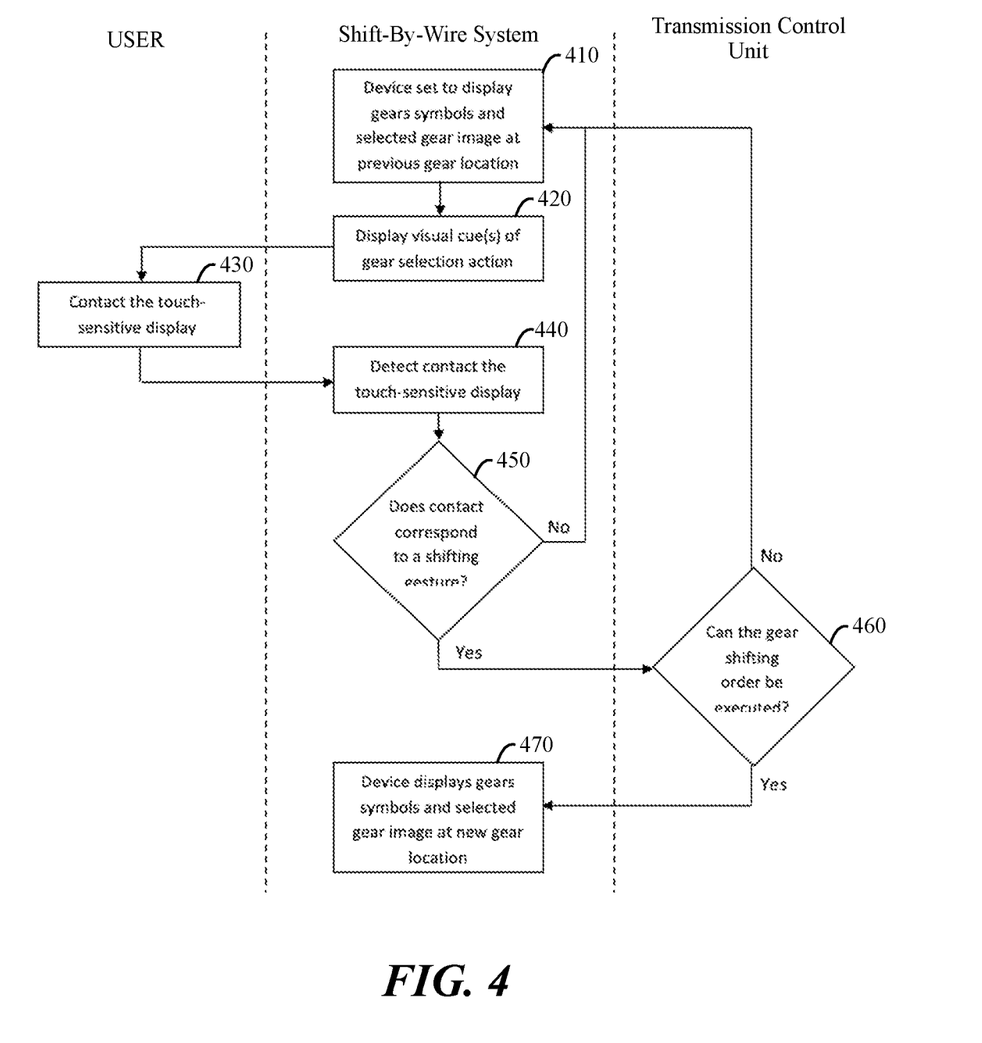
FIG. 4 illustrates a flowchart of the method steps performed by the shift-by-wire system, according to some embodiments.

FIG. 4 illustrates a method of interacting with the device during operation of motor vehicle to select and modify a gear selection of the vehicle transmission. In block 410, the device is programmed, via the processor executing instructions stored in the memory, to display gear selection symbols (such as "D," "N," "R," "P") and an indicator for the selected gear. The visual cue of gear selection action is displayed in block 420 prompting the user to contact the touch sensitive display in block 430. The touch-sensitive display detects the contact of the user on the touch-sensitive display in block 440, and the processor determines if the contact corresponds to a shifting gesture in block 450. If the processor determines a shifting gesture was performed, the processor determines the validity of the shift to be executed by consulting a rule set stored in the memory in block 460. If the shift gesture is valid, in block 470, the device displays gear symbols and selected gear image at the new gear region which corresponds to the shift gesture executed by the driver.

Figure 5:
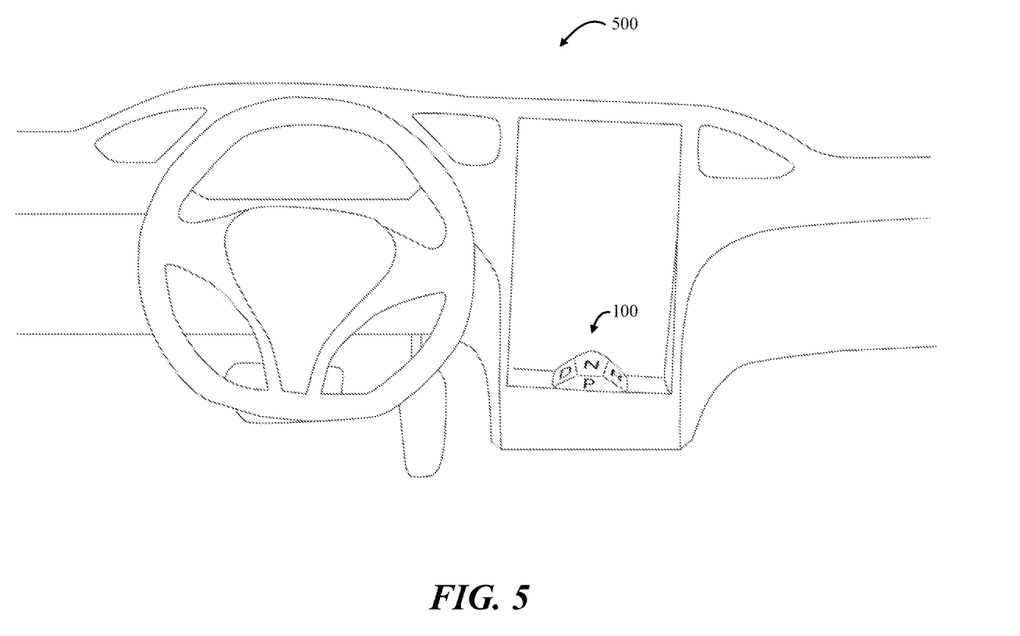
FIG. 5 illustrates a vehicle dashboard including the shift-by-wire system, according to some embodiments.

FIG. 5 illustrates an exemplary vehicle dashboard 500 including device 100 mounted at a communicable range to the driver of the vehicle. One skilled in the art will readily appreciate that the particular location of the device 100 may change per the vehicle design, layout, or for aesthetic purposes. The device 100 is preferentially positioned to be accessible to the driver at all times during normal operating procedures of the vehicle. Visual attention of the driver is preferentially not drawn away from the environment while operating the vehicle. The haptic, visual, and/or audio feedback allows for differentiable interactions between the driver and the device 100 to facilitate the focus of operating the vehicle without distracting the driver.

Figure 6A:
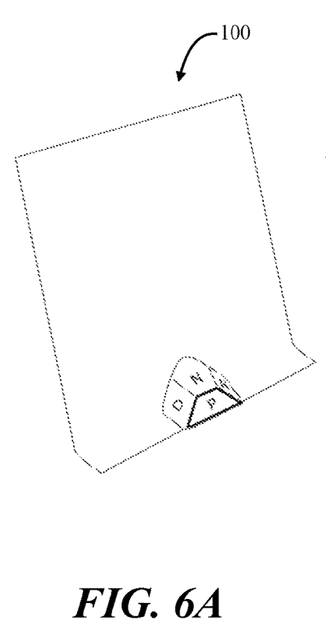
FIG. 6A illustrates an alternative configuration of the shift-by-wire system, according to some embodiments.
Figure 6B:
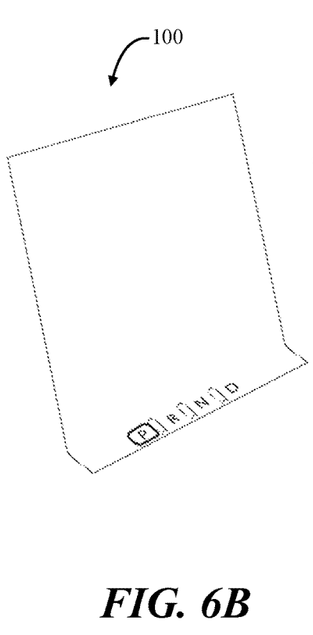
FIG. 6B illustrates an alternative configuration of the shift-by-wire system, according to some embodiments.
Figure 6C:
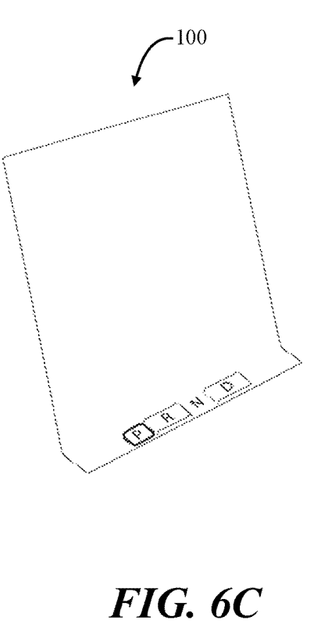
FIG. 6C illustrates an alternative configuration of the shift-by-wire system, according to some embodiments.
Figure 7A:
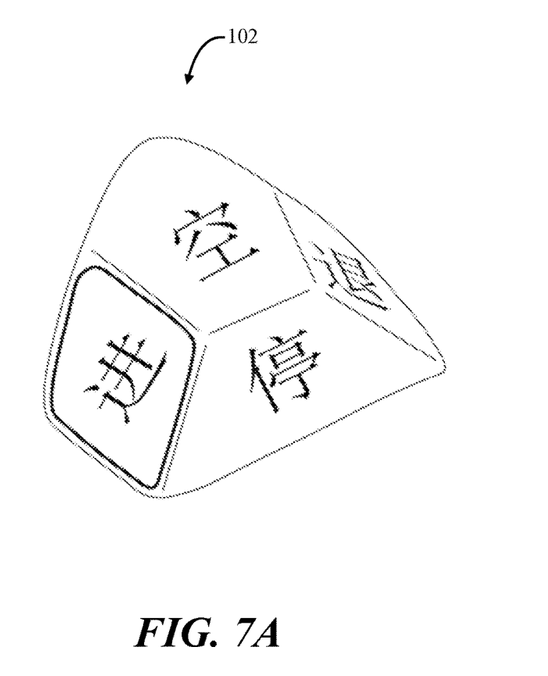
FIG. 7A illustrates an alternative configuration of the shift-by-wire system, according to some embodiments.
Figure 7B:
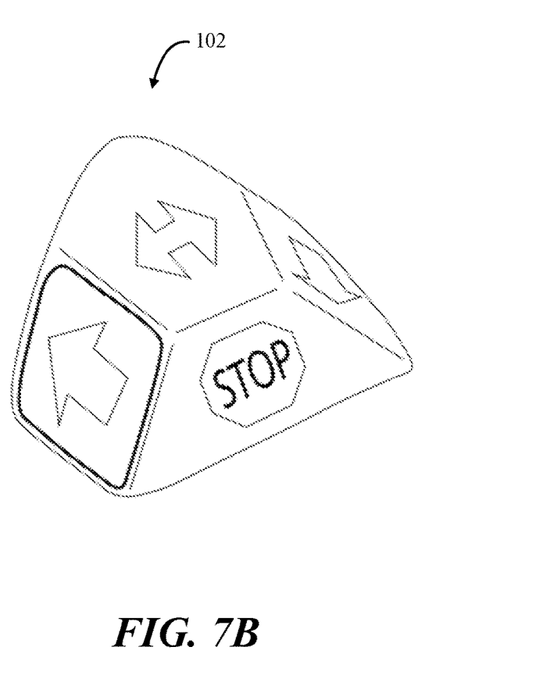
FIG. 7B illustrates an alternative configuration of the shift-by-wire system, according to some embodiments.

FIGS. 6A, 6B, and 6B illustrate alternative configurations of the device 100 and selectable gear shifting regions. Further, FIGS. 7A and 7B provide alternative configurations of the display 102 which can include various languages, gear symbols, and other intuitive operational signals.

Processors suitable for the execution of a computer program include both general and special purpose microprocessors and any one or more processors of any digital computing device. The processor will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB flash drive). Memory devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The memory may include a computer-readable medium storing the application, which may include instructions. In an embodiment, the memory may contain different components for retrieving, presenting, changing, and saving data and may include computer-readable media. The memory module may include a variety of memory devices, for example, Dynamic Random-Access Memory (DRAM), Static RAM (SRAM), flash memory, cache memory, and other memory devices. Additionally, for example, a memory module and processors may be distributed across several different computing devices that collectively comprise a system. The memory module is capable of storing each user-generated information to be displayed on the computing device display.

It will be appreciated by persons skilled in the art that the present embodiment is not limited to what has been particularly shown and described hereinabove. A variety of modifications and variations are possible in light of the above teachings without departing from the following claims.

What is claimed is:

1. A shift-by-wire system comprising:
   a) one or more touch sensitive displays;
   b) a memory;
   c) one or more processors; and
   d) one or more modules stored in the memory, the one or more modules comprising instructions executable by one or more processors to perform the following steps:
      i) displaying a gear selection indicator at a predefined region, the gear selection indicator displayed in a predefined region as instructed by the transmission control unit;
      ii) detecting a contact with the one or more touch sensitive displays at the predefined region corresponding to a gear selection indicator;
      iii) determining a gesture performed by a user and associating the gesture with a gear selection;
      iv) transmitting an output signal to the transmission control unit corresponding the gear selection and affecting, via the transmission control unit, a vehicle transmission; and
      v) displaying the gear selection via the gear selection indicator on the predefined region, wherein the touch-sensitive display is comprised of a 3-dimensional surface having the plurality of predefined regions, wherein each predefined region corresponds to a unique gear selection, wherein 3-dimensional surface is sectioned by separations between a plurality of 3-dimensional surfaces, and wherein the predefined shifting regions are defined by elevated or depressed regions of the 3-dimensional surface.

2. The system of claim 1, wherein the 3-dimensional touch-sensitive display is comprised of at least two displays, wherein at least two of the displays are positioned in non-parallel planes.

3. The system of claim 1, wherein the 3-dimensional display is comprised of at least one curved display.

4. The system of claim 1, further comprising an instruction to display a visual cue to communicate a direction a permitted gesture to perform a shift function.

5. The system of claim 4, wherein the visual cue comprises text.

6. The system of claim 4, wherein the visual cues comprise an arrow indicating the permitted direction of the gesture between a first region and a second region.

7. The system of claim 1, further comprising instructions to display a visual alert to the driver to indicate the acceptance or denial of the gear selection gesture.

8. The system of claim 1, further comprising an electromagnetic actuator to create haptic feedback signals to indicate the acceptance or denial of the gear selection gesture.

9. The system of claim 1, wherein the selected gear indicator is moved according to the transmission control unit during autonomous operation of the vehicle.

10. The system of claim 1, wherein the touch-sensitive screen further comprises a force sensor permitting gear selection via push actuation on the predefined gear selection region.

11. The system of claim 10, wherein the force sensor and the electromagnetic actuator are in operable communication to provide feedback to a gesture.

12. The system of claim 1, wherein the gear selection indicators are letters, symbols, words, or images.

13. The system of claim 1, wherein the gear selection indicators include at least one of the following: one or more arrows, wherein a forward arrow corresponds to a drive gear selection, including a rearward arrow corresponds to a reverse gear selection, wherein a pause symbol corresponds to a neutral gear selection and wherein a stop symbol corresponds to a park gear selection.

* * * * *